UNITED STATES PATENT OFFICE.

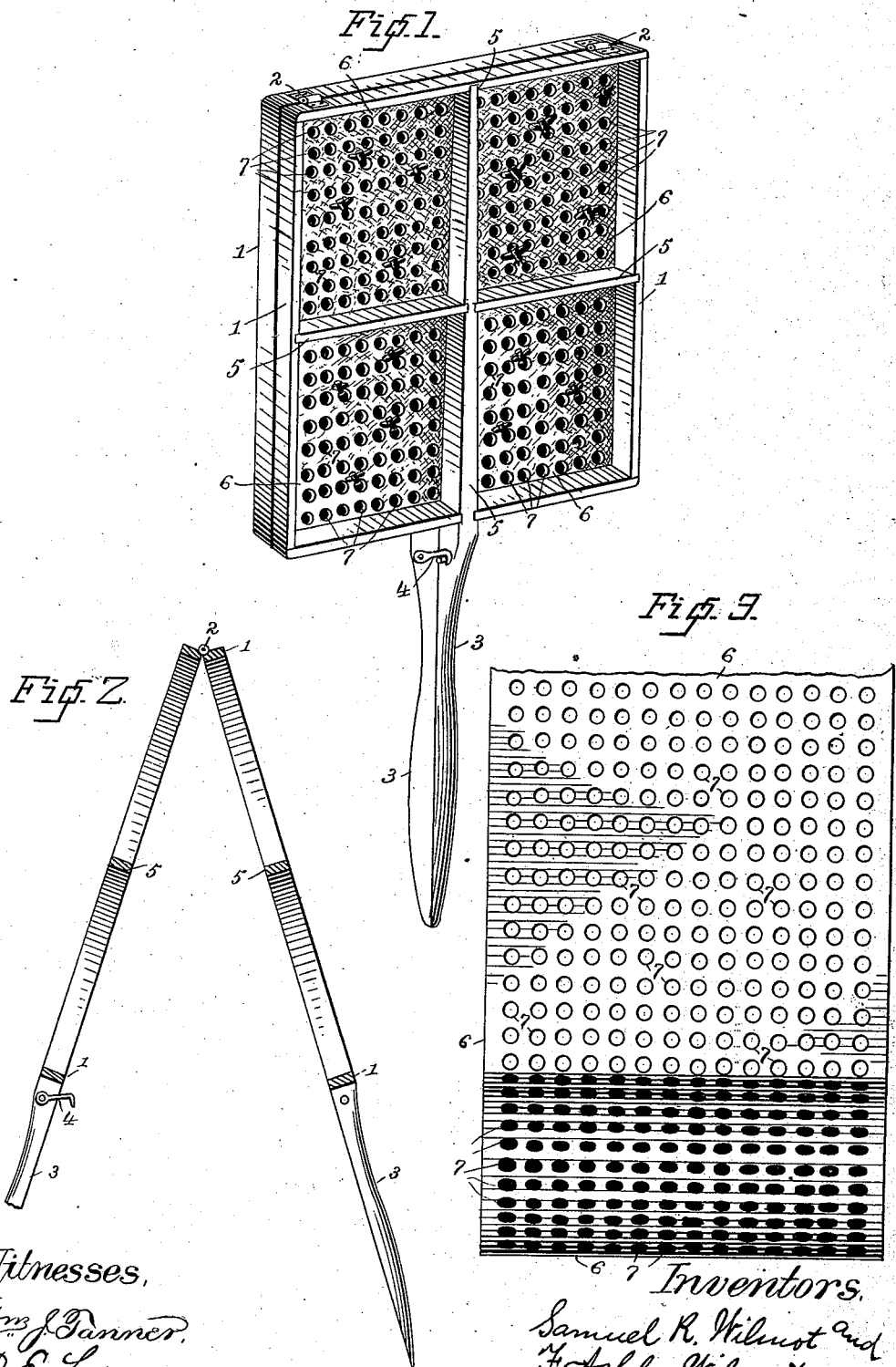

SAMUEL R. WILMOT AND F. ASHLEY WILMOT, OF BRIDGEPORT, CONNECTICUT.

DEVICE FOR CATCHING FLIES.

SPECIFICATION forming part of Letters Patent No. 382,580, dated May 8, 1888.

Application filed February 20, 1888. Serial No. 264,596. (No model.)

*To all whom it may concern:*

Be it known that we, SAMUEL R. WILMOT and F. ASHLEY WILMOT, citizens of the United States, residing at Bridgeport, in the county of Fairfield and State of Connecticut, have invented certain new and useful Improvements in Devices for Catching Flies, &c.; and we do hereby declare the following to be a full, clear, and exact description of the invention, such as will enable others skilled in the art to which it appertains to make and use the same.

Our invention has for its object to provide an inexpensive and convenient device for catching flies and other insects. The essential requirements in a device of this class are that it shall be so constructed as to be readily prepared for use, convenient and effective in operation, and, furthermore, that when a quantity of flies or other insects have been caught, they may be readily disposed of and the device reprepared for use with but an instant's delay.

With these ends in view we have devised the simple and novel device, of which the following description, in connection with the accompanying drawings, is a specification.

Figure 1 is a perspective of the device complete and ready for use; Fig. 2, a section, the paper being removed and the parts of the frame swung apart; and Fig. 3 is a view of a roll of paper, illustrating the manner in which we preferably prepare it for use in our improved device.

1 denotes the parts of the frame, which are preferably hinged together in any suitable manner, as at 2. The frame may be made in any preferred shape, but is preferably made square, so that the perforated sticky paper or other open-work material by which the insects are caught may be readily fitted in place from the roll. One or both parts of the frame are usually provided with handles 3, for convenience in use, and the parts may be secured together in any suitable manner—as, for example, by a catch, 4, which we have shown as pivoted to one of the parts of a double handle.

5 denotes cross-pieces, any number of which may be used, depending, of course, upon the size of the frame, to assist in supporting the sticky material.

6 denotes open-work material, covered preferably on both sides with some kind of viscid compound. The special compound used forms no portion of our invention. Ordinary fly-paper covered on one or both sides with a sticky substance will answer the purpose perfectly.

We have found in practice that the best material to place between the parts of the frame is paper made sticky on both sides and provided with perforations 7, to permit free passage of the air, it being, of course, desirable to make the perforations as large as possible to permit free passage of the air, but at the same time not so large as to allow insects to pass through. If preferred, a net-work of textile material coated on both sides with a sticky substance may be used instead of paper. As already stated, however, we preferably use perforated paper, which we prepare in rolls, as shown in Fig. 3. In practice the paper is preferably made just the width of the frame.

To prepare the device for use, the frame is opened and the end of a piece of paper is stuck to one edge of the frame on the inner side. The paper is then unrolled across it, the frame closed together, and the paper cut off just outside of the frame. We have described this special manner of using the device at length, as we have in practice found it to be the most convenient, it being absolutely essential that the sticky open-work material used between the parts of the frame shall be furnished in such shape that pieces may be removed and inserted with but an instant's delay, so that the device is practically always ready for use.

It should be noted that by employing a two-part frame having cross-pieces on both sides all danger of soiling a table-cloth or other article is avoided. The device may in fact be hung or laid anywhere with perfect safety.

Having thus described our invention, we claim—

A device for catching flies and other insects, consisting of a two-part frame the parts of which are fitted to fold over upon themselves and are provided with cross-pieces, and
5 having between the parts thereof a piece of open-work material covered with suitable sticky substance.

In testimony whereof we affix our signatures in presence of two witnesses.

SAMUEL R. WILMOT.
    F. ASHLEY WILMOT.

Witnesses:
 A. M. WOOSTER,
 BENTRA E. LEE.